United States Patent
Schutzmeier et al.

(10) Patent No.: US 11,170,237 B2
(45) Date of Patent: Nov. 9, 2021

(54) METHOD, DEVICE, AND SYSTEM FOR DETERMINING A ROAD CONSTRUCTION SITE

(71) Applicant: Bayerische Motoren Werke Aktiengesellschaft, Munich (DE)

(72) Inventors: Thomas Schutzmeier, Unterhaching (DE); Andreas Winckler, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 128 days.

(21) Appl. No.: 16/601,877

(22) Filed: Oct. 15, 2019

(65) Prior Publication Data

US 2020/0042807 A1 Feb. 6, 2020

Related U.S. Application Data

(63) Continuation of application No. PCT/EP2018/056685, filed on Mar. 16, 2018.

(30) Foreign Application Priority Data

May 15, 2017 (DE) .................. 10 2017 208 124.4

(51) Int. Cl.
G06K 9/00 (2006.01)
G08G 1/01 (2006.01)
G08G 1/052 (2006.01)

(52) U.S. Cl.
CPC ..... *G06K 9/00818* (2013.01); *G06K 9/00798* (2013.01); *G08G 1/0112* (2013.01); *G08G 1/052* (2013.01)

(58) Field of Classification Search
CPC .......... G06K 9/00818; G06K 9/00798; G08G 1/0112; G08G 1/052
See application file for complete search history.

(56) References Cited

U.S. PATENT DOCUMENTS 9,177,212 B2 * 11/2015 Meis ................ G08G 1/096716
10,148,917 B2 * 12/2018 Hegemann ............ H04N 7/183
(Continued)

FOREIGN PATENT DOCUMENTS

DE 10 2009 036 433 A1 5/2010
DE 10 2012 003 632 A1 10/2012
(Continued)

OTHER PUBLICATIONS

International Search Report (PCT/ISA/210) issued in PCT Application No. PCT/EP2018/056685 dated Jun. 27, 2018 with English translation (seven pages).
(Continued)

*Primary Examiner* — Santiago Garcia
(74) *Attorney, Agent, or Firm* — Crowell & Moring LLP

(57) ABSTRACT

A method for determining a road construction site for a motor vehicle, with which a sensor system and a communications interface are associated, which includes: providing a first measurement signal of the sensor system, representing a sign of a first speed limit for the motor vehicle and determining a location-related actual speed identification according to the first measurement signal. The method also includes: providing mapped data including information relating to a location-related local speed limit and detecting a road construction site according to the actual speed identification and the mapped data.

15 Claims, 4 Drawing Sheets

(56) References Cited

U.S. PATENT DOCUMENTS

| | | | |
|---|---|---|---|
| 2009/0256722 A1* | 10/2009 | Mase | G08G 1/0955 |
| | | | 340/907 |
| 2013/0101174 A1* | 4/2013 | Meis | G06K 9/00798 |
| | | | 382/104 |
| 2015/0317901 A1 | 11/2015 | Hegemann et al. | |
| 2016/0046290 A1* | 2/2016 | Aharony | B60W 10/20 |
| | | | 701/41 |
| 2017/0008521 A1* | 1/2017 | Braunstein | G08G 1/167 |
| 2017/0057516 A1* | 3/2017 | Gordon | G05D 1/0088 |
| 2017/0061787 A1 | 3/2017 | Lorkowski et al. | |
| 2017/0242436 A1* | 8/2017 | Creusot | G08G 1/096816 |
| 2018/0237009 A1* | 8/2018 | Chutorash | B60K 37/06 |
| 2018/0268698 A1* | 9/2018 | Michalakis | B60W 40/02 |

FOREIGN PATENT DOCUMENTS

| | | |
|---|---|---|
| DE | 10 2012 025 159 A1 | 6/2014 |
| WO | WO 2011/167251 A1 | 12/2011 |

OTHER PUBLICATIONS

German-language Written Opinion (PCT/ISA/237) issued in PCT Application No. PCT/EP2018/056685 dated Jun. 27, 2018 (eight pages).

\* cited by examiner

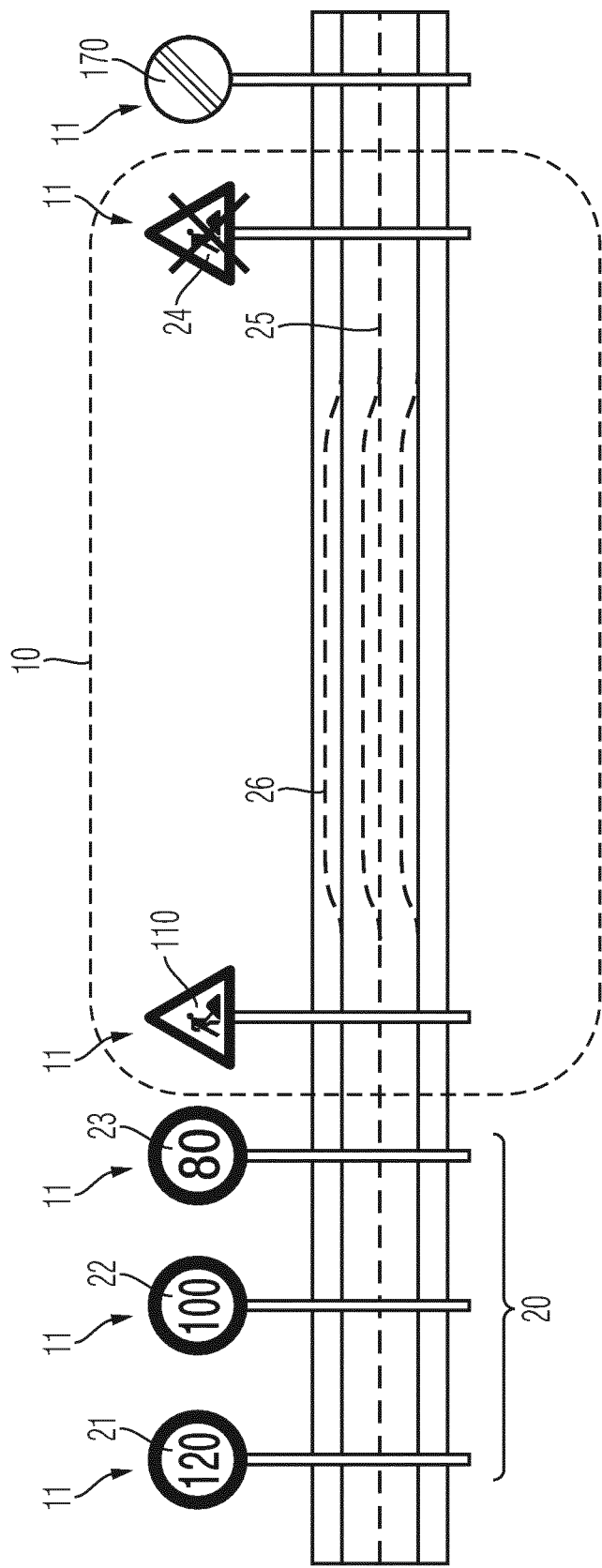

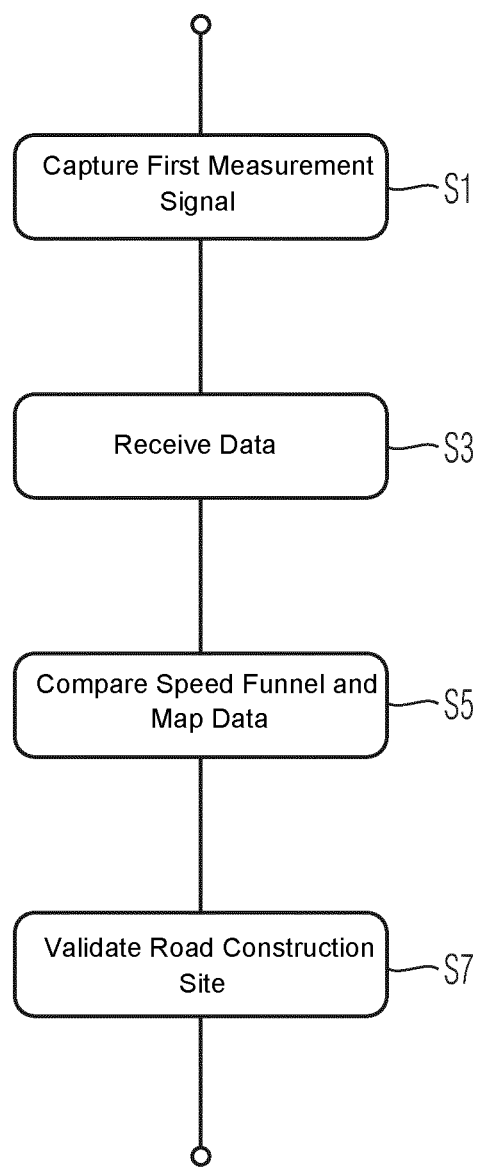

METHOD, DEVICE, AND SYSTEM FOR DETERMINING A ROAD CONSTRUCTION SITE

CROSS REFERENCE TO RELATED APPLICATIONS

This application is a continuation of PCT International Application No. PCT/EP2018/056685, filed Mar. 16, 2018, which claims priority under 35 U.S.C. § 119 from German Patent Application No. 10 2017 208 124.4, filed May 15, 2017, the entire disclosures of which are herein expressly incorporated by reference.

BACKGROUND AND SUMMARY OF THE INVENTION

The invention relates to a method, a device and a system for determining a road construction site which in each case enables a reliable identification of a road construction site and contributes to a low misidentification rate.

Some motor vehicles have navigation systems which, inter alia, receive information relating to road construction sites which is provided by means of real-time traffic information (RTTI) services. These services are informed, for example, by state agencies and/or road operators of planned and existing construction sites. Tables are generated therefrom in which the start and end of a construction site are recorded for a highway section. Services of this type can be provided by a manufacturer of a navigation system, an automobile association, or the like.

The information relating to construction sites is used for route planning and journey time calculation in order to propose the shortest possible route to a user. Traffic flow can furthermore be speeded up on the whole if as few vehicles as possible travel a route section with a construction site. Depending on how complete, up-to-date, accurate and correct the sources of construction site information are, the information supplied to a navigation device often corresponds only inadequately to reality. The location, route and extent of a construction site can vary due to organizational circumstances and construction progress without these data being included in the aforementioned real-time traffic information. Discrepancies between the planning of the construction site and the actual situation on the road result in inaccuracies and errors in the real-time traffic information service based thereon. As a result, the location and time of the occurrence of construction sites are either not reported or are not correctly reported. The planning of a route and the calculation of the journey time are thereby hindered.

An underlying object of the invention is therefore to provide a method, a device and a system for determining a road construction site which in each case enables a reliable identification of a road construction site and contributes to a low misidentification rate.

The object is achieved by the features of the independent patent claims. Advantageous designs of the invention are indicated in the subclaims.

According to one aspect of the invention, a method for determining a road construction site for a motor vehicle to which a sensor system and a communication interface are assigned comprises providing a first measurement signal of the sensor system which represents a signposting of a first speed limit for the motor vehicle, and determining a location-related actual speed identification depending on the first measurement signal. The method furthermore comprises providing mapped data which comprise information relating to a location-related local speed limit. The method furthermore comprises detecting a road construction site depending on the actual speed identification and the mapped data.

A road construction site can be reliably identified by means of the described method, thereby contributing, in particular, to a low misidentification rate. A road construction site is identified not only on the basis of a prescribed reduction of the speed of the motor vehicle, but additional available data, such as provided map information, are incorporated into an identification of the road construction site. In this way, the described method enables an identification of road construction sites and a differentiation of such road sections, for example, a tunnel or an area that is traffic-calmed for noise reduction purposes, which are also normally preceded by one or more speed limits in the direction of travel. The method thus contributes to reducing the number of road sections erroneously identified as a road construction site.

The mapped data containing information relating to a location-related local speed limit can be provided, in particular, in the form of a roadmap on an external server unit or by a map manufacturer, and can be retrieved using the method, thus enabling an alignment with the determined speed information of the actual speed identification. The described method thus implements, in particular, a georeferenced fusion of determined data with map data for speed limits, so that a reduction of the misidentification rate can be achieved.

The received data with map information are normally provided by a map manufacturer, but are not usually updated in the map material for the duration of a road construction site. The existence of a road construction site can be validated by evaluating the determined actual speed identification with the corresponding location-related map information of the mapped data. If, for example, the data of the determined actual speed identification match the map information within a tolerance range, the existence of a road construction site can be excluded or at least classified as doubtful.

According to one preferred development, the method comprises determining a reference speed identification depending on the received or provided mapped data, and comparing the determined actual speed identification with the determined reference speed identification. The road construction site is then detected depending on the comparison of the actual speed identification with the reference speed identification. The actual speed identification represents, for example, a current location-related state of the motor vehicle in which a speed limit has been recorded or detected. The associated local reference speed identification can be determined using the method from a stored speed limit or can be provided as a finalized reference specification. The existence of a road construction site can be validated by comparing the actual speed identification with the reference speed identification.

According to one preferred development, the method comprises providing a second measurement signal of the sensor system which represents a signposting of a second speed limit for the motor vehicle, and determining a speed funnel depending on the captured first and second measurement signals. The determined actual speed identification can comprise information relating to a single traffic sign and or a plurality of traffic signs which form a speed funnel which represents a regulated sequence of speed restrictions which limit the permitted route-related maximum speed step-by-step in stages down to a target value.

In relation to a direction of travel of the motor vehicle, the second and further speed limits normally have lower values for a respective speed restriction than those respectively preceding them. The motor vehicle is, for example, to decelerate from a current speed of 140 km/h initially to 100 km/h and then to 80 km/h, so that an associated speed funnel of the different values can be set up for the speed limits.

The method can be carried out on the motor vehicle side, but, due to a multiplicity of information to be processed and determined data which can be collated in relation to a vehicle fleet with a multiplicity of motor vehicles, a processing and evaluation of the collated data and a determination and validation of the road construction site are advantageously carried out in an external server unit and/or backend. A respective motor vehicle to which a corresponding sensor system and communication interface are assigned thus implements a mobile measuring station for determining a road construction site, so that at least a recording of traffic-associated parameters and a generation of measurement signals by means of the sensor system and transmission of the captured measurement signals and, where relevant, evaluated data are carried out on the motor vehicle side. In this way, a beneficial mapping of different road construction sites and validation of the road construction sites on a respective roadway are possible according to the described method.

The respective captured measurement signals and/or the determined speed funnel or the determined actual speed identification can be transmitted by means of the communication interface to the external server unit and can be further processed according to the described method. According to one particularly preferred development of the method, the determination of the road construction site comprises providing and evaluating a plurality of respectively determined actual speed identifications which are assigned to different motor vehicles. In this way, the acquired and or determined data can be transmitted, for example, to a backend and can be stored in a data memory and can be made available, in particular, for further processing. This enables the collection and aggregation of a multiplicity of determined or determinable road construction sites which can be aligned with one another and can thus be verified with a low misidentification rate, thus enabling a creation of a beneficial roadmap with verified road construction sites which can have an advantageous effect on road traffic.

Measurement signals recorded or captured and/or data determined using the described method are preferably transmitted to and/or received by the server unit outside the motor vehicle. In this way, the received data containing information relating to a local speed restriction can be made available in a database of the server unit, for example in the form of a roadmap, and can be retrieved during the performance of the method. In addition, data containing information relating to one or more road construction sites which have been determined accordingly by other motor vehicles and have been stored in the database of the server unit or backend can be received by a server unit or backend of this type. Such data comprise, in particular, position information which has been determined, for example, by means of a location system and is allocated to the identified road construction sites.

The described method is supplemented according to one such development with the use of a networking of motor vehicles with one another or a networking of a multiplicity of motor vehicles with the external server unit and/or a different backend, wherein the motor vehicles are in each case capable of capturing measured values and determining a road construction site. In this way, respective road construction sites determined at different positions can be transmitted to a backend and can be made available for further processing. In addition, a road construction site at one position can be validated by a plurality of different motor vehicles, so that a contribution is made to a low misidentification rate.

The data relating to the road construction sites are determined by means of a crowdsourcing method in which the vehicles of the road users generate data to define the position of the road construction site. As a result, it is possible to generate current data for road construction sites with a comparatively low outlay. The current position of mobile road construction sites can furthermore be recorded. The signposting for the first speed limit is implemented by a first traffic sign, the position of which is detected by a respective motor vehicle and is transmitted to a central unit, such as the external server unit or a backend.

The backend, as a central unit, can form part of the described external server unit or, alternatively, can be designed as a database separate from the server unit. On the basis of the collected, mapped information relating to a respective road construction site, a roadmap with validated road construction sites can be created and stored in the form of a digital map in a database of the server unit and, which can have an advantageous effect on road traffic, particularly in terms of journey time.

According to one preferred development, the method can comprise, in particular, receiving or providing a fourth measurement signal of the sensor system which comprises data with information relating to a lane-marking color. A method of this type furthermore comprises determining a lane-marking color of a road marking depending on the fourth measurement signal and incorporating the determined lane-marking color into the detection of the road construction site. For this purpose, the sensor system preferably has a camera, so that the lane-marking color of a road marking can be determined using a camera. These developments of the method exploit the presence of colored road markings in the areas of road construction sites, so that the road construction site can be determined on the basis of a determined actual speed identification which comprises, for example, a determined speed funnel, an alignment with available map data and on the basis of colored road markings. Yellow road markings are normally applied to the road in the area of a road construction site and form a deviating traffic routing, taking precedence over the normal white road markings so that a road construction site can be identified, verified and validated on the basis of these yellow road markings.

By means of this preferred development of the method, a reconstruction of the road construction site is possible in a backend through crowdsourcing by means of camera-based identification of signposted speed restrictions and lane markings. By means of such a georeferenced fusion of a determined speed funnel with camera-based information relating to lane marking colors, road construction sites can also be reliably identified in permanently speed-reduced highway or road sections. In many countries, road construction sites are temporarily provided with yellow or differently colored lane markings which differ recognizably from the standard road markings.

A misidentification rate in relation to the determination of a road construction site can therefore be reduced by evaluating and georeferencing the camera-based identification of lane marking colors in a targeted manner and by transmitting it to the backend. On the basis of this information, road construction sites can be reliably identified, for example, as follows: according to the described method, a potential road construction site is validated through comparison of the determined speed funnel. In addition, a check is carried out to determine whether information relating to the existence of yellow lane markings following on from the speed funnel can then be determined or is present in the backend. If the presence of differently colored road markings can be affirmed, the corresponding road section is classified as a road construction site.

In addition, the method can furthermore comprise providing a fifth measurement signal of the sensor system which represents an ambient brightness. Depending on the fifth measurement signal, an ambient brightness is determined which can be incorporated, in particular, into the determination of the lane marking color of the road marking. In the determination of a lane marking color, a, for example, white road marking can appear yellow due to evening road lighting. A misidentification rate of the camera-based classification of yellow lane markings can be suppressed or at least reduced by evaluating the ambient brightness.

A data collection relating to the determination of the lane marking color therefore preferably takes place in the daytime or as from a predefined threshold value for the ambient brightness which is assessed as sufficient for a reliable color recognition by means of the sensor system that is used. This also applies, inter alia, to road sections in tunnels and can be filtered on a roadmap basis on the vehicle side or outside the vehicle in the server unit. An accuracy or signal-to-noise ratio can furthermore be increased through aggregation of information of many motor vehicles within a road section.

According to one development, the method comprises capturing or providing a sixth measurement signal of the sensor system which comprises data with information relating to a current speed of the motor vehicle, and determining a current speed of the motor vehicle depending on the captured sixth measurement signal. The determination of the speed of the motor vehicle can be enabled, in particular, by means of a speed sensor or position sensor.

In particular, the method can also comprise determining a local speed profile depending on a plurality of respectively determined speeds of respective motor vehicles. In this way, a driving behavior can be incorporated into a detection of the road construction site and the road construction site to be determined can be further validated and a misidentification rate can be minimized as a result. In this way, a further validation can be carried out via crowdsourcing of speeds, so that a particularly reliable verification of the determined road construction sites or road construction sites to be determined can be implemented with a low misidentification rate.

The validation is preferably carried out by determining a respective average speed of a respective motor vehicle. The speeds of the associated vehicles, for example, are regularly georeferenced and transmitted to the backend for this purpose. If, for example, a speed funnel is identified which is configured to introduce an exit lane, a large number of motor vehicles will not normally adhere to the prescribed speed limit and a road construction site section will not be inferred. In addition, it can also be ascertained on the basis of speed profiles whether a previously identified road construction site has now been removed.

In relation to the described measurement signals, the sensor system has a respective sensor or a respective device which enables a recording of a physical parameter and a generation of the associated measurement signal. The sensor system thus comprises, for example, a camera, a position sensor, a speed sensor and/or a brightness sensor which is implemented, for example, as a photodiode.

A further aspect of the invention relates to a device for determining a road construction site which is configured to carry out one of the methods described above. A device of this type is implemented, for example, as a server unit or backend and is designed to receive, process and forward data which are determined or processed in connection with the method. Alternatively or additionally, a control unit of the motor vehicle can also be enabled as a device for detecting a road construction site and for carrying out one of the described methods. However, particularly in terms of a multiplicity of measurement signals, data and information to be processed from different motor vehicles, the described method is preferably carried out in a backend outside the motor vehicle.

A further aspect of the invention furthermore relates to a system for determining a road construction site which comprises a motor vehicle and a design of the device described above. The motor vehicle has the sensor system and the communication interface and thus implements a mobile measuring station for determining a road construction site and, particularly in the interaction within a vehicle fleet with a multiplicity of such motor vehicles, enables an identification of road construction sites with a low misidentification rate.

Example embodiments of the invention are explained in detail below on the basis of the schematic drawings, in which:

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3 shows a schematic example embodiment of a road section with a road construction site.

FIG. 4 shows a schematic flow diagram for methods for determining a road construction site.

DETAILED DESCRIPTION OF THE DRAWINGS

Elements of the same design or function are denoted with the same reference numbers in all figures. For reasons of clarity, the elements represented may not be denoted with reference numbers in all figures.

Figure 1:
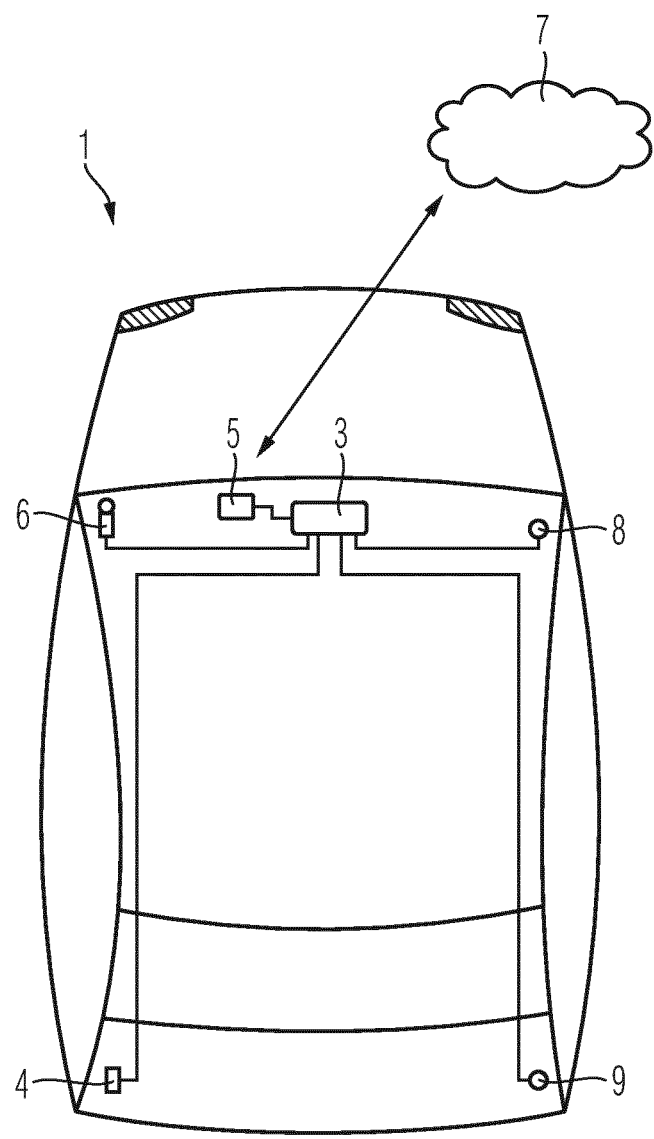
FIG. 1 shows a schematic example embodiment of a system for determining a road construction site.

FIG. 1 illustrates an example embodiment of a system for determining a road construction site 10 with a motor vehicle 1 in a schematic view. The system furthermore has an arrangement which comprises a communication interface 5 and a sensor system 6, 8, 9 which are coupled with the communication interface 5 using signaling technology by means of a control unit 3 of the motor vehicle 1. The communication interface 5 is configured to communicate bi-directionally with a server unit 7 outside the motor vehicle 1 and to transmit data to and receive data from said server unit.

The arrangement with the sensor system 10, 12, 14 and the communication interface 5 enables a method to be carried out to determine a road construction site 10 of a road section. As will be explained with reference to the following FIGS. 2 and 3, the system and the method enable a reliable identification of a road construction site 10 and contribute to a low misidentification rate which can furthermore have an advantageous effect on the associated road traffic.

The sensor system enables the capture of measurement signals which comprise data with traffic-related information or at least information which can have an effect on the determination of the road construction site 10. In particular, the sensor system comprises a camera 6 by means of which a respective signposting 11 of traffic signs can be identified. First, second and third measurement signals, for example, containing data with information relating to a respective signposting 11 for a first, a second and a third speed restriction 21, 22 and 23 (see FIG. 3) are captured by means of the camera 6. Further signpostings 11, illustrating, for example, a road construction site sign 110 or an end sign 170 can be captured by means of the camera 6 (see FIG. 2). In addition, the camera 6 can be used, in particular, to determine a lane-marking color of a road marking 24, 25 by capturing, for example, a fourth measurement signal which comprises data with information relating to a lane-marking color.

The sensor system can furthermore comprise a brightness sensor 8 to capture a fifth measurement signal which represents an ambient brightness, so that an ambient brightness which should be taken into account, particularly in relation to the determination of a lane-marking color, can be determined depending on the fifth measurement signal.

The sensor system can furthermore comprise a speed sensor 9 to capture a sixth measurement signal and determine a current speed of the motor vehicle 1. In addition, the sensor system preferably comprises a position sensor 4 which can supply information relating to a current position of the motor vehicle 1, in particular during the capture of a respective measurement signal.

The respective measurement signals can be captured by means of the sensor system and can be transmitted by means of the communication interface 5 to the external server unit 7 and/or the backend 300 for storage and processing. The capture of measurement signals and the transmission and reception of data can be controlled by means of the control unit 3. Data, for example, parameters, are preferably determined and the method is preferably carried out by means of a computing and storage unit of the server unit 7 and/or of the backend 300. Alternatively or additionally, method steps can also be carried out on the vehicle side in the control unit 3 which is then enabled accordingly for this purpose. The server unit 7 and the backend 300 can implement two units separate from one another and can be designed as a common central unit.

Figure 2:
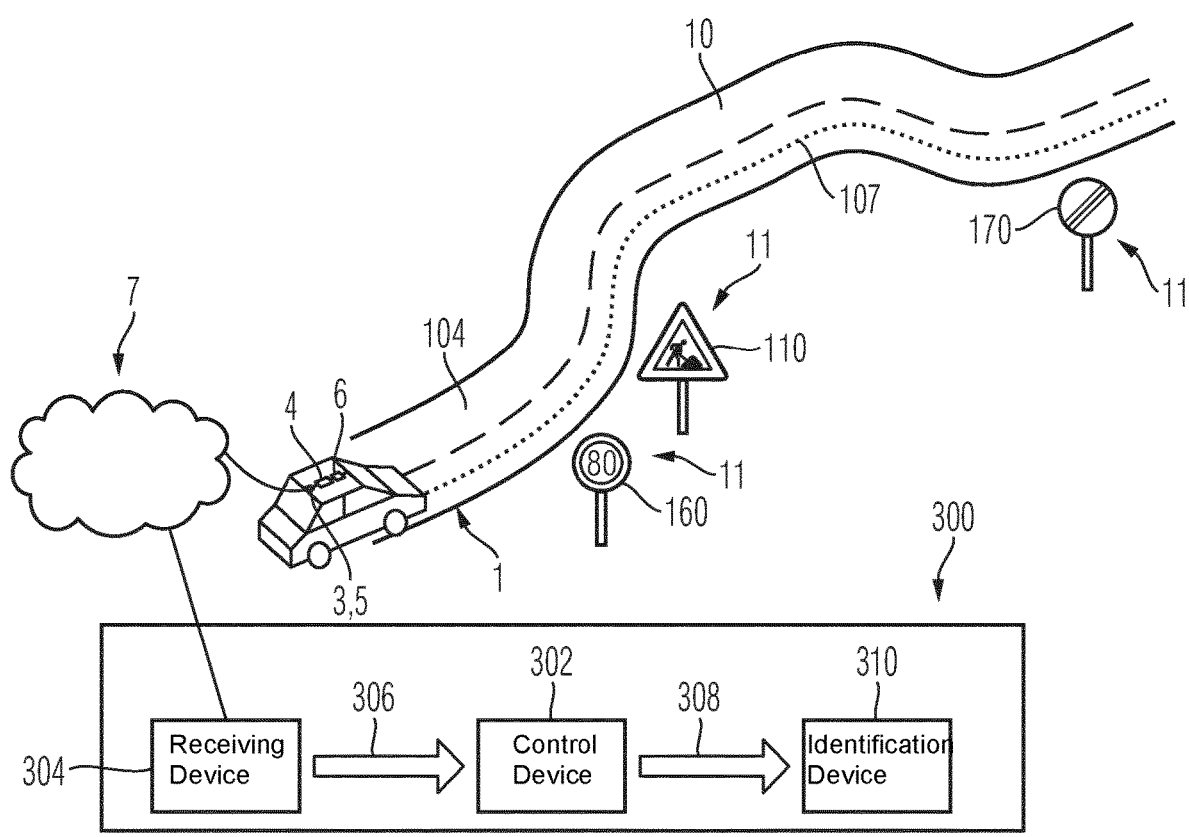
FIG. 2 shows a further schematic example embodiment of the system for determining a road construction site.

FIG. 2 illustrates, for example schematically, a system according to FIG. 1 on a road which has a road construction site 10. The motor vehicle 1 has the forward-facing camera 6, a position sensor 4, for example, a GNSS sensor according to a satellite-based positioning system, and the control unit 3 and communication interface 5.

The motor vehicle 1 represents, for example, a passenger vehicle and travels on a highway section 104 on which a road construction site 10 is located. A first traffic sign 160 indicating a first speed restriction or speed limit 21 is located in the area of the road construction site 10. A trajectory 107 of the highway furthermore changes in the area of the road construction site 10. The camera 6, on the one hand, detects the traffic signs 160 and, on the other hand, can identify the trajectory 107 of the motor vehicle 1. The trajectory 107 of the motor vehicle 1 can also be detected via the position sensor 4.

The camera 6 can also detect a further traffic sign 110 indicating a signposting 11 of a construction site. The camera 6 can also detect a following further traffic sign 170 indicating the lifting of the speed restriction 160. An actual speed can also be determined as the current speed of the motor vehicle 1 by means of the position sensor 4 or via the rotational speed of the wheels.

The motor vehicle 1 transmits the detected events which comprise, for example, the identification of the first traffic sign 160, the identification of the second traffic sign 170, the actual trajectory 107 and/or the detected actual speed by means of the communication interface 5 via a wireless network connection to a receiving device of the server unit 7 and/or a receiving device 304 of a remote backend 300 which forwards the detected and/or determined information relating to potential construction sites from the receiving events.

The receiving events received by the receiving device 304 comprise the type of the event and a position, for example a GNSS position. The receiving events are forwarded by the receiving device 304 via a communication connection 306 to a control device 302 which forwards the receiving events via a communication connection 308 to a construction site identification device 310. The construction site identification device determines a presence of a presumed construction site on the basis of the transmitted data and validates this presumed construction site on the basis of further available data in order to verify the construction site 10 and avoid or at least counteract a misidentification.

FIG. 3 illustrates a further schematic example embodiment of a road section with a road construction site 10 and a plurality of signpostings 11 of traffic signs and different road markings 24, 25. The first, second and third different speed limits 21, 22 and 23 implement a speed funnel 20 which is detected by means of the camera 6 and can be determined using the method to identify the road construction site 10. The speed funnel 20 can also be determined on the basis of two different speed limits or on the basis of one speed limit. The road marking 25 illustrates, for example, a normal white traffic routing, whereas the road marking 26 represents a different, colored, for example yellow, traffic routing which are applied to the road in the area of the road construction site 10.

A method for identifying and validating the road construction site 10 can be carried out according to the flow diagram shown in FIG. 4. In a step S1 of the method, a first measurement signal with a first speed limit 23 is captured, for example, by means of the camera 6 and a speed funnel 20 is determined in the comparison with a current actual speed. On the basis of the determined speed funnel 20, the suspicion arises that said funnel precedes a road construction site.

In a step S3 of the method, available data are received from the server unit 7 and/or the backend 300 comprising map information with local speed limits. These data may be provided, for example, by a map manufacturer in the form of a digital roadmap.

The determined speed funnel 20 and the received map data are compared with one another in a further step S5 in order to validate the presumed road construction site. If it is determined, for example, that the determined speed funnel 20 is also indicated at the correspondingly associated position on the digital roadmap, the presumed road construction site is not classified as a road construction site 10, since such map information is not normally updated on short-term construction sites and existing speed funnels are placed in front in the direction of travel, for example in traffic-calmed areas or tunnels. If no speed funnel can otherwise be located on the basis of the map data at the position where the speed funnel 20 has been determined by means of the motor vehicle 1, the road section is verified by the construction site identification device 310 as a road construction site 10.

In a further step S7 of the method, the determined road construction site 10 can be validated on the basis of a lane-marking color in order to contribute to a particularly reliable identification of the road construction site 10 and counteract a misidentification. Measurement signals which comprise data with information relating to the road markings are captured by means of the camera 6. If, for example, as indicated in FIG. 3, a yellow road marking 26 is detected, the presence of a road construction site 10 is particularly probable due to the determined speed funnel 20 and the determined yellow lane-marking color.

In addition, a multiplicity of such acquired data and determined information, in particular, which, in the interaction of different vehicles as a vehicle fleet, can be processed and evaluated with one another in each case according to the vehicle 1 via the server unit 7 and/or the backend 300.

A method of this type therefore uses the fusion of determined data with received map information and, where relevant, determined lane-marking colors and a further verification by means of crowdsourcing in order to enable a particularly reliable determination and validation of the road construction site 10 and contribute to a low misidentification rate.

REFERENCE NUMBER LIST

1 Motor vehicle
3 Control unit
4 Position sensor
5 Communication interface
6 Camera
7 Server unit
8 Brightness sensor
9 Speed sensor
10 Road construction site
104 Highway section
107 Trajectory of the highway section
11 Signposting
12 Road section
110 Traffic sign
160 Traffic sign
170 Traffic sign
20 Speed funnel
21 First speed limit
22 Second speed limit
23 Third speed limit
24 End sign of the construction site
25 White road marking
26 Yellow road marking
300 Backend
302 Control device of the backend
304 Receiving device of the backend
306 Communication connection
308 Communication connection
310 Road construction site identification device
S(i) Respective step of a method for reconstructing a construction site for a motor vehicle The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for determining a road construction site for a motor vehicle to which a sensor system and a communication interface are assigned which are coupled with one another using signaling technology, comprising:
   providing a first measurement signal of the sensor system which represents a first signposting of a first speed limit for the motor vehicle,
   determining a location-related actual speed identification depending on the first measurement signal,
   providing mapped data which comprise information relating to a location-related local speed limit, and
   determining a location of a road construction site depending on the location-related actual speed identification and the mapped data,
   wherein determining the location of the road construction site includes providing a plurality of determined actual speed identifications which are assigned to different motor vehicles, evaluating the plurality of determined actual speed identifications, and determining the location of the road construction site based on the plurality of determined actual speed identifications.

2. The method according to claim 1, comprising:
   determining a reference speed identification depending on the mapped data,
   comparing the determined actual speed identification with the determined reference speed identification, and
   detecting the road construction site depending on a comparison of the location-related actual speed identification with the reference speed identification.

3. The method according to claim 1, comprising:
   providing a second measurement signal of the sensor system which represents a second signposting of a second speed limit for the motor vehicle, and
   determining a speed funnel depending on the captured first and second measurement signals, wherein the actual speed identification comprises the speed funnel.

4. The method according to claim 1, comprising:
   providing a fourth measurement signal of the sensor system which represents a lane-marking color, and
   determining a lane-marking color of a road marking depending on the fourth measurement signal, and
   detecting the road construction site depending on the determined lane-marking.

5. The method according to claim 4, in which the sensor system has a camera and in which the lane-marking color of a road marking is determined using a camera.

6. A method for determining a road construction site for a motor vehicle to which a sensor system and a communication interface are assigned which are coupled with one another using signaling technology, comprising:
   providing a first measurement signal of the sensor system which represents a first signposting of a first speed limit for the motor vehicle,
   determining a location-related actual speed identification depending on the first measurement signal,
   providing mapped data which comprise information relating to a location-related local speed limit,
   determining a location of a road construction site depending on the location-related actual speed identification and the mapped data,
   providing a fourth measurement signal of the sensor system which represents a lane-marking color,
   determining a lane-marking color of a road marking depending on the fourth measurement signal, detecting the road construction site depending on the determined lane-marking,
providing a fifth measurement signal of the sensor system which represents an ambient brightness,
determining an ambient brightness depending on the fifth measurement signal, and
determining the lane-marking color of the road marking depending on the determined ambient brightness.

7. The method according to claim 1, further comprising:
providing a sixth measurement signal of the sensor system which represents a current speed of the motor vehicle,
determining a location-related current speed of the motor vehicle depending on the captured sixth measurement signal, and
detecting the road construction site depending on the determined speed of the motor vehicle.

8. A device for determining a road construction site for a motor vehicle which is configured to carry out a method according to claim 1.

9. A motor vehicle with a device for determining a road construction site according to claim 8, and a sensor system and a communication interface which are coupled with one another using signaling technology.

10. The method according to claim 2, comprising:
providing a second measurement signal of the sensor system which represents a second signposting of a second speed limit for the motor vehicle, and
determining a speed funnel depending on the captured first and second measurement signals, wherein the actual speed identification comprises the speed funnel.

11. The method according to claim 2, comprising:
providing a fourth measurement signal of the sensor system which represents a lane-marking color, and
determining a lane-marking color of a road marking depending on the fourth measurement signal, and
detecting the road construction site depending on the determined lane-marking.

12. The method according to claim 3, comprising:
providing a fourth measurement signal of the sensor system which represents a lane-marking color, and
determining a lane-marking color of a road marking depending on the fourth measurement signal, and
detecting the road construction site depending on the determined lane-marking.

13. The method according to claim 5, comprising:
providing a fifth measurement signal of the sensor system which represents an ambient brightness, and
determining an ambient brightness depending on the fifth measurement signal, and
determining the lane-marking color of the road marking depending on the determined ambient brightness.

14. The method according to claim 2, further comprising:
providing a sixth measurement signal of the sensor system which represents a current speed of the motor vehicle,
determining a location-related current speed of the motor vehicle depending on the captured sixth measurement signal, and
detecting the road construction site depending on the determined speed of the motor vehicle.

15. The method according to claim 3, further comprising:
providing a sixth measurement signal of the sensor system which represents a current speed of the motor vehicle,
determining a location-related current speed of the motor vehicle depending on the captured sixth measurement signal, and
detecting the road construction site depending on the determined speed of the motor vehicle.

\* \* \* \* \*